(12) United States Patent
Smith, III

(10) Patent No.: US 7,575,256 B2
(45) Date of Patent: Aug. 18, 2009

(54) BORE LINER FOR UNDERSEA HYDRAULIC COUPLING

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 1183 days.

(21) Appl. No.: 10/636,898

(22) Filed: Aug. 6, 2003

(65) Prior Publication Data

US 2005/0029749 A1  Feb. 10, 2005

(51) Int. Cl.
F16L 21/03 (2006.01)
F16L 17/03 (2006.01)
F16L 47/08 (2006.01)

(52) U.S. Cl. .................. 285/374; 285/110; 285/239

(58) Field of Classification Search .............. 285/110, 285/112, 113, 239, 370, 374
See application file for complete search history.

(56) References Cited

U.S. PATENT DOCUMENTS

| | | | |
|---|---|---|---|
| 2,087,418 A | 7/1937 | Campbell | |
| 2,825,590 A * | 3/1958 | Sutherland | 277/589 |
| 2,897,533 A * | 8/1959 | Bull et al. | 16/2.1 |
| 3,111,179 A * | 11/1963 | Albers et al. | 239/591 |
| 3,527,480 A | 9/1970 | Larson | |
| 3,656,783 A * | 4/1972 | Reeder | 285/239 |
| 3,929,356 A | 12/1975 | DeVincent et al. | |
| 4,076,279 A | 2/1978 | Klotz | |
| 4,089,549 A | 5/1978 | Vyse | |
| 4,179,142 A * | 12/1979 | Schopp | 285/239 |
| 4,426,104 A | 1/1984 | Hazelrigg | |
| 4,439,068 A | 3/1984 | Pokladnik | |
| 4,637,470 A | 1/1987 | Weathers | |
| 4,666,187 A | 5/1987 | Koot | |
| 4,694,859 A | 9/1987 | Smith, III | |
| 4,712,809 A * | 12/1987 | Legris | 285/21.1 |
| 4,747,606 A * | 5/1988 | Jennings | 277/612 |
| 4,754,780 A | 7/1988 | Smith, III | |
| 4,775,173 A * | 10/1988 | Sauer | 285/148.14 |
| 4,813,716 A | 3/1989 | Lalikos et al. | |
| 4,844,517 A * | 7/1989 | Beiley et al. | 285/382.4 |
| 4,900,071 A * | 2/1990 | Smith, III | 285/379 |
| 4,905,766 A * | 3/1990 | Dietz et al. | 169/91 |
| 4,915,419 A | 4/1990 | Smith, III | |
| 5,052,439 A * | 10/1991 | Smith, III | 137/614.04 |
| 5,099,882 A * | 3/1992 | Smith, III | 137/614.04 |
| 5,203,374 A * | 4/1993 | Smith, III | 137/614.04 |
| 5,232,021 A * | 8/1993 | Smith | 137/614.04 |
| 5,325,890 A | 7/1994 | Wilkins | |
| 5,333,691 A | 8/1994 | Dean | |
| 5,390,702 A * | 2/1995 | Smith, III | 137/614.04 |
| 5,762,106 A * | 6/1998 | Smith, III | 137/614.04 |
| 5,771,927 A * | 6/1998 | Johansen et al. | 137/614.04 |
| 6,179,002 B1 * | 1/2001 | Smith, III | 137/614.04 |
| 6,206,040 B1 * | 3/2001 | Smith, III | 137/614.04 |
| 6,575,430 B1 * | 6/2003 | Smith, III | 251/149.7 |
| 6,575,500 B1 * | 6/2003 | Wili | 285/243 |

* cited by examiner

Primary Examiner—James M Hewitt
(74) Attorney, Agent, or Firm—Wong, Cabello, Lutsch, Rutherford & Brucculeri, LLP

(57) ABSTRACT

An undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned.

20 Claims, 12 Drawing Sheets

BORE LINER FOR UNDERSEA HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves a removable bore liner for an undersea hydraulic coupling member.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical seal retainer. When the male and female portions of the coupling are parted under pressure, the seal retainer prevents the metal seal from blowing out through the bore of the female member.

U.S. Pat. Nos. 4,900,071 and 5,052,439 to Robert E. Smith III disclose an undersea hydraulic coupling with an elastomeric seal that is restrained from radial movement into the central bore of the female member by a circumferential shoulder on one or both surfaces adjacent the seal. Preferably, the seal has a dovetail interfit with one or both surfaces. U.S. Pat. Nos. 5,099,882, 5,203,374, 5,232,021 to Robert E. Smith III also show undersea hydraulic couplings with these seals. An inner cylindrical surface of the annular seal engages the circumference of the male member or probe as the probe is inserted into the female member. As the male member or probe is pulled out of the female member bore, the leading face of the male member reaches the soft annular seal intermediate that bore. When the face reaches the midpoint of the soft annular seal, the dovetail interfit prevents the seal being imploded into the bore, as the seawater and/or hydraulic fluid enter the bore at high pressure.

To retain one or more seals in the female member of an undersea hydraulic coupling, a seal retainer may be attached to the female member. The seal retainer may be a generally sleeve-shaped cylindrical body that is inserted into the bore of the female member until the seal retainer abuts a shoulder in the bore of female member. To secure the seal retainer against the shoulder, a retainer locking member may also be attached to the female member using threads or snap rings, for example. A radial seal may be retained between the seal retainer and retainer locking member. Additionally, one or more face seals may be positioned between the seal retainer and shoulder.

In subsea drilling and production applications, female coupling members may be disengaged and re-engaged from male coupling members repeatedly. After disengagement, it is common that the male coupling members remain undersea and the female coupling members retrieved. Insertion of the male coupling member into the bore of the female coupling member, or removal of the male coupling member from the bore, may result in galling of the surfaces of the probe and/or bore. Galling may be caused, for example, by significant misalignment, or even very slight misalignment, of the male and female coupling members during their engagement or disengagement. In general, galling of the male and/or female coupling members is a serious problem because of damage to the sealing surfaces that are important to maintain fluid tight seals to block leakage of hydraulic fluid and/or entry of seawater into the coupling at high pressure. Additionally, after a sealing surface of either coupling member becomes galled, it may be more likely to gall again.

In the past, some male undersea hydraulic coupling members have been made from material with greater hardness, strength and yield than the material used to make female coupling members. The difference in hardness is intended to help reduce the galling problem. However, it is desirable to produce both the male and female coupling members from higher strength, higher yield materials, especially as hydraulic pressures and/or subsea pressures increase at greater depths where subsea hydraulic systems are located. Accordingly, an undersea hydraulic coupling is needed that will reduce or prevent the galling problem due to repeated engagement and disengagement of the coupling members.

SUMMARY OF THE INVENTION

The present invention provides an undersea hydraulic coupling with a removable bore liner. The bore liner may be a removable, durable polymer sleeve that fits in at least part of the bore of a female undersea hydraulic coupling member. The bore liner may be integral with one or more radial seals that extend radially inwardly from the bore liner and seal between the male and female coupling members. Part of the bore liner may be engaged to the female undersea hydraulic coupling member using threads on the outer circumference of the bore liner, a ridge, ring or groove on the outer surface of the bore liner, a dovetail interfit between the bore liner and the female coupling member and/or seal retainer, or various other restraining means. The bore liner may be used to retrofit undersea hydraulic couplings to help minimize galling and reduce further galling of the sealing surfaces of the male and/or female coupling members.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

In one embodiment, the bore liner for undersea hydraulic couplings may be a sleeve made from a polymer material. One example of a polymer material that may be used is a semicrystalline thermoplastic from the polyether ketone family such as Victrex® PEEK™. In general, the bore liner material should have low friction and high durability, and should not be chemically attacked or degraded by substances such as seawater or hydraulic fluid. The sleeve-shaped bore liner may be removable from an undersea hydraulic coupling member so that the bore liner may be replaced or reused repeatedly. The bore liner may have a radial thickness of at least approximately 0.0010 inches.

The bore liner also may include an integral sealing section having one or more radial seals. The seal section and liner section of a bore liner may be a one-piece or integral body, or the bore liner may include or be split into two or more sections.

Part or all of the bore liner may intefit and/or removably attach to the bore of a female undersea hydraulic member. Thus, the bore liner may be restrained from axial movement after it is positioned in the female coupling member.

Figure 1:
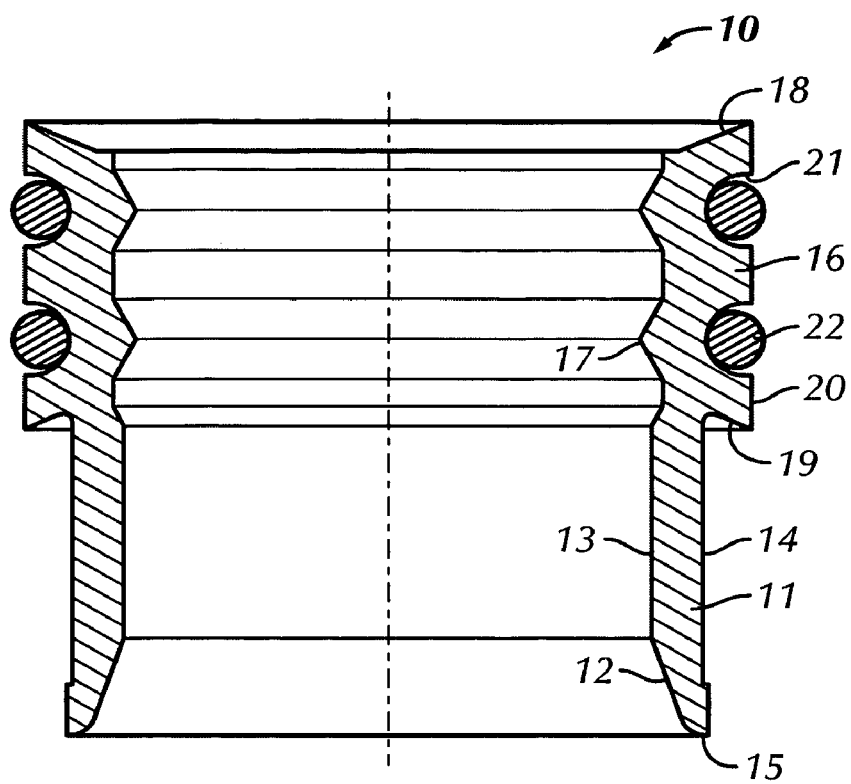
FIG. 1 is a section view of a bore liner of the present invention according to a first embodiment.

As shown in FIG. 1, in a first embodiment bore liner 10 may include liner section 11 and seal section 16. The liner section has an inner diameter 13 and an outer diameter 14. In one embodiment, end face 15 of the liner section may have a tapered portion 12 at the inner diameter thereof. The seal section may include one or more sealing surfaces 17 that project radially inwardly further than the inner diameter of the bore liner. Thus, the inner diameter of sealing surfaces 17 should be less than the inner diameter of the liner section. The sealing surfaces may be dimensioned to engage the outer surface of the male coupling member or probe. In one embodiment, the seal section may have outer shoulders 18, 19 that may be dimensioned to interfit with a female coupling member to help secure the bore liner thereto. For example, the shoulders may provide a dovetail interfit. The seal section has outer diameter 20 and also may include one or more grooves 21 in which O-rings 22 may be positioned to seal with the female coupling member bore.

Figure 2:
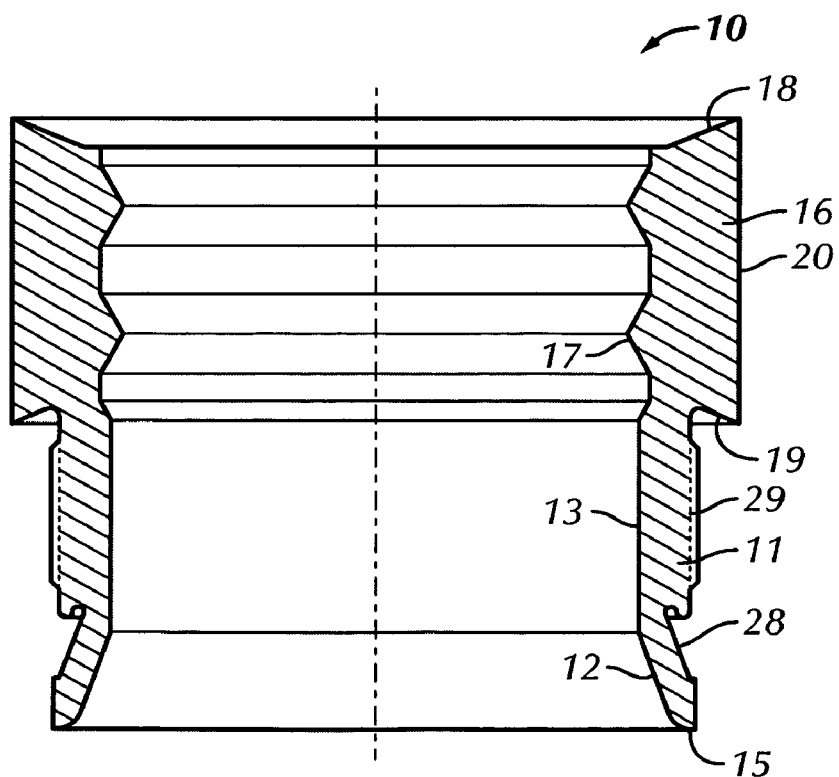
FIG. 2 is a section view of a bore liner of the present invention according to a second embodiment.

As shown in FIG. 2, a second embodiment with the same elements identified with the same reference numbers as the first embodiment with the following differences. Outer diameter 20 of seal section 16 may be a generally planar circumferential surface without grooves or O-rings. Additionally, the outer diameter of the liner section may have threads 29 to help secure the bore liner to a female undersea hydraulic coupling member. Further, the outer diameter of the seal section may include interlocking cavity 28 to help secure the bore liner to a female undersea hydraulic coupling member.

Figure 3:
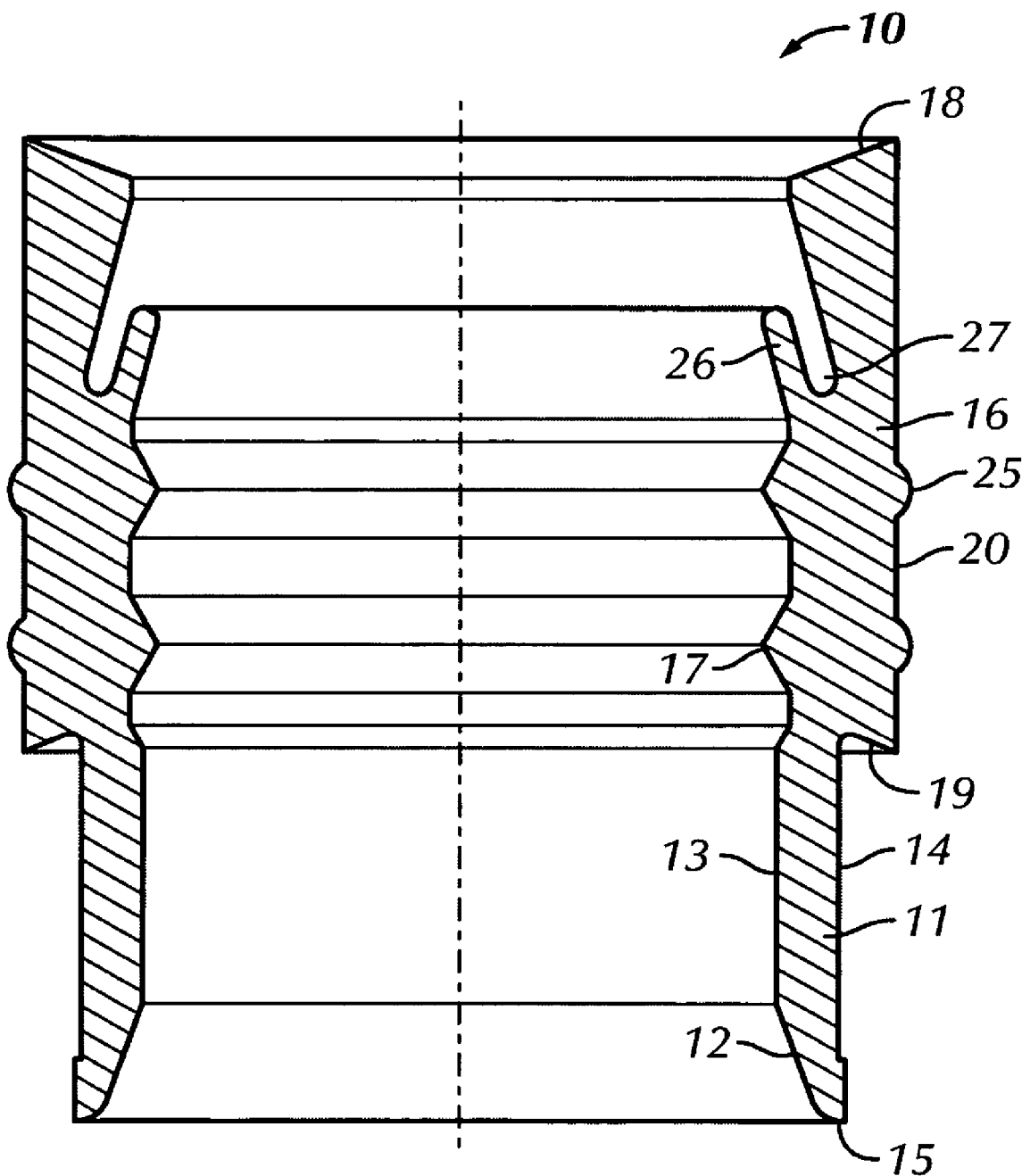
FIG. 3 is a section view of a bore liner of the present invention according to a third embodiment.

As shown in FIG. 3, a third embodiment with the same elements identified with the same reference numbers as the previous embodiments with the following differences. Outer diameter 20 of seal section 16 may have one or more seal projections 25 to seal with the female coupling member. The seal section also may have sealing lip 26 which may be pressure energized by fluid pressure in cavity 27 to urge the sealing lip against the male coupling member.

Figure 4:
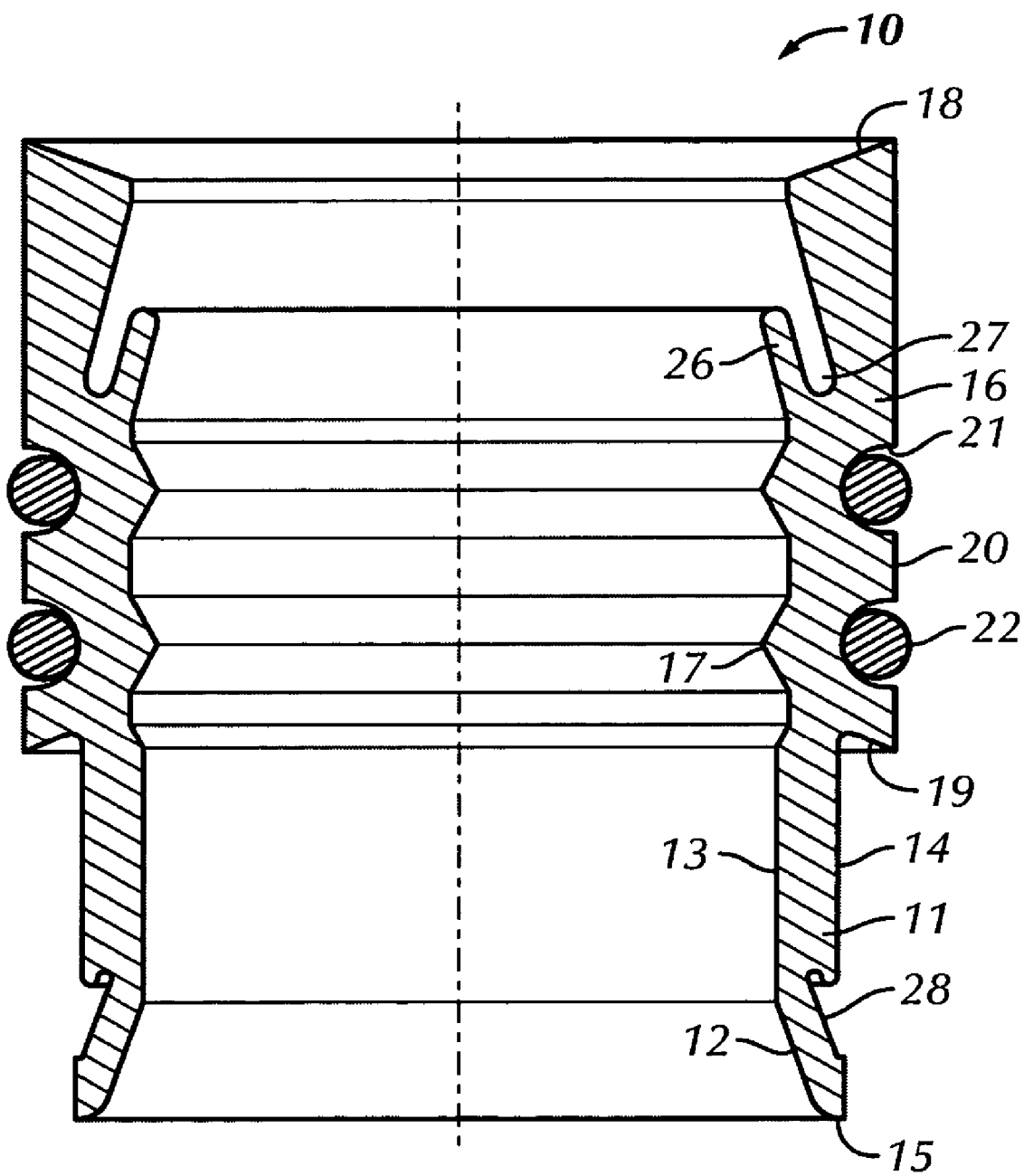
FIG. 4 is a section view of a bore liner of the present invention according to a fourth embodiment.

As shown in FIG. 4, a fourth embodiment with the same elements identified with the same reference numbers as the previous embodiments with the following differences: This embodiment includes sealing lip 26 and interlocking section 28.

Figure 5:
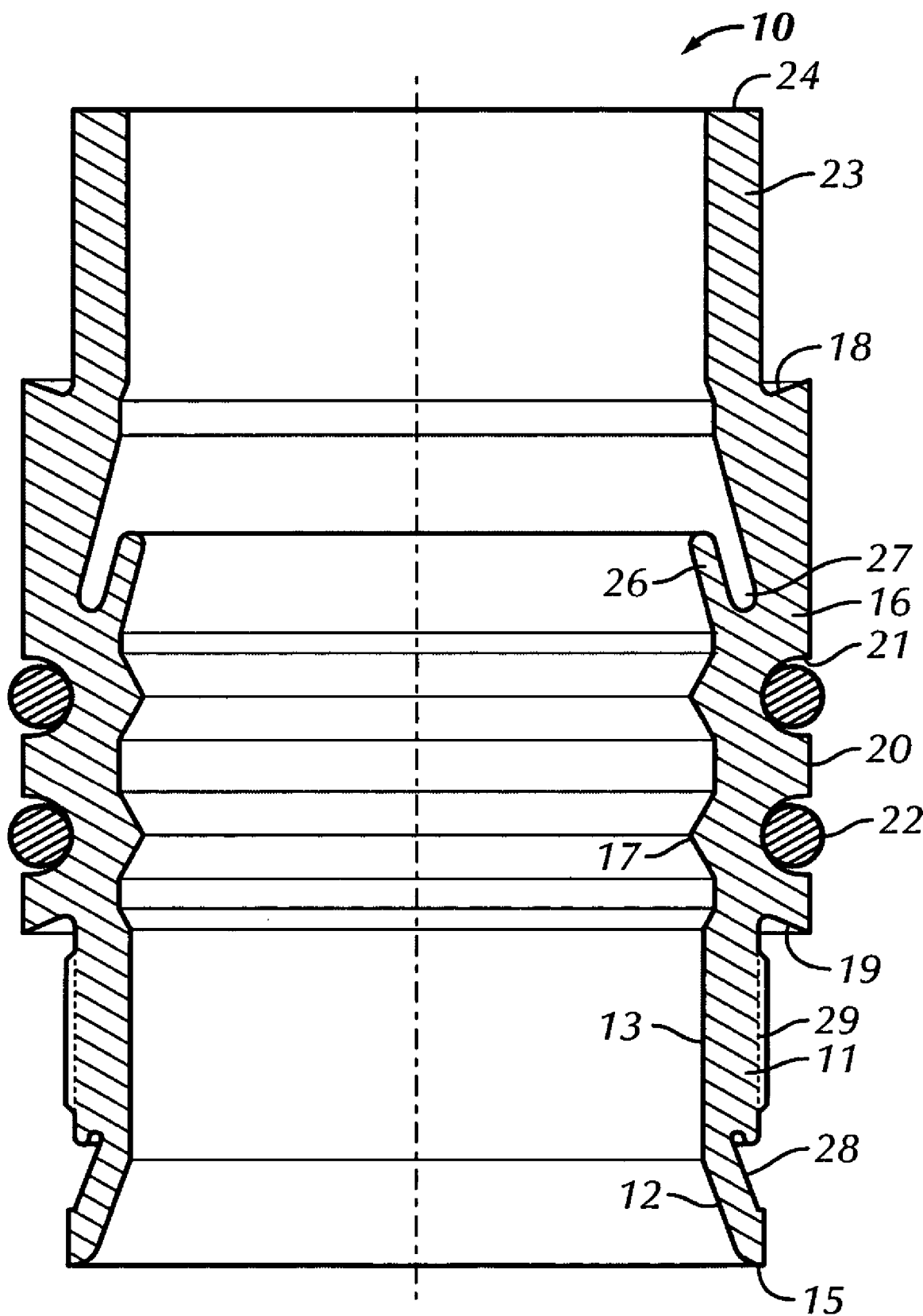
FIG. 5 is a section view of a bore liner of the present invention according to a fifth embodiment.

As shown in FIG. 5, a fifth embodiment with the same elements identified with the same reference numbers as the previous embodiments with the following differences. Bore liner 10 also may include integral liner extension 23 which may extend axially from seal section 16 and terminate at end 24. The inner diameter of the integral liner extension may be the same or substantially the same as inner diameter 13 of liner section 11.

Figure 6:
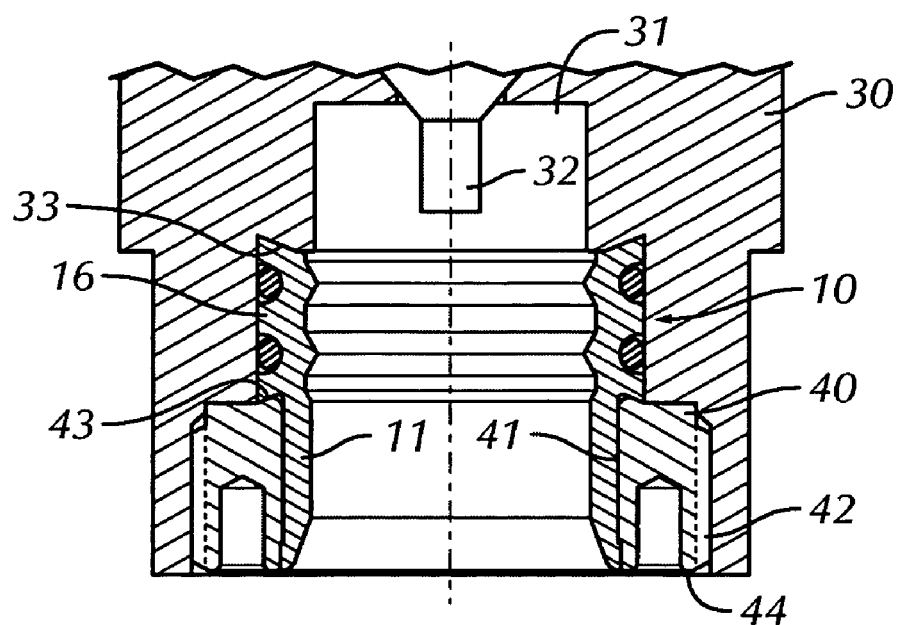
FIG. 6 is a section view of the first embodiment of a bore liner of the present invention in a female undersea hydraulic coupling member.

As shown in FIG. 6, the first embodiment of bore liner 10 is shown in a female undersea hydraulic coupling member 30. The female undersea hydraulic coupling member may include receiving chamber or bore 31 and normally closed poppet valve 32 to control the flow of hydraulic fluid through the bore. Seal section 16 of the bore liner may have a dovetail interfit between inclined shoulder 33 and inclined inner end face 43 of retainer nut 40. The retainer nut may have a threaded outer diameter 42 to engage the female coupling member. The retainer nut also may have an inner diameter 41 which is dimensioned to provide a sliding interfit with liner section 11. The inner diameter of the retainer nut also may have one or more steps thereon. For example, steps on the inner diameter of the retainer nut may mate with steps on the outer diameter of the liner section. The retainer nut also may have an outer end face 44 with slots or cavities used for a tool to turn the retainer nut.

Figure 7:
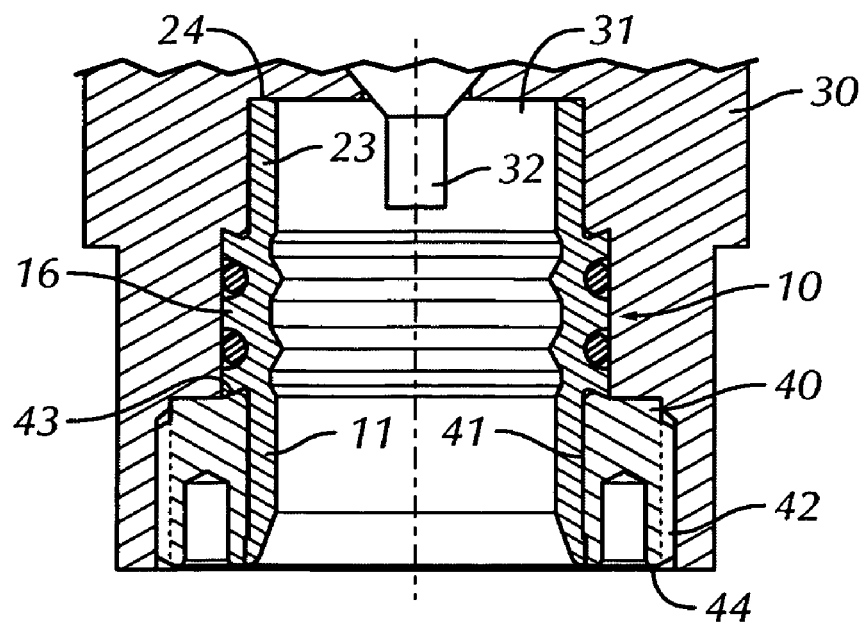
FIG. 7 is a section view of another embodiment of a bore liner of the present invention in a female undersea hydraulic coupling member.

As shown in FIG. 7, another embodiment with the same elements identified with the same reference numbers as FIG. 6 with the following differences. Integral liner extension 23 may extend axially from seal section 16 of bore liner 10 and terminate at end 24.

Figure 8:
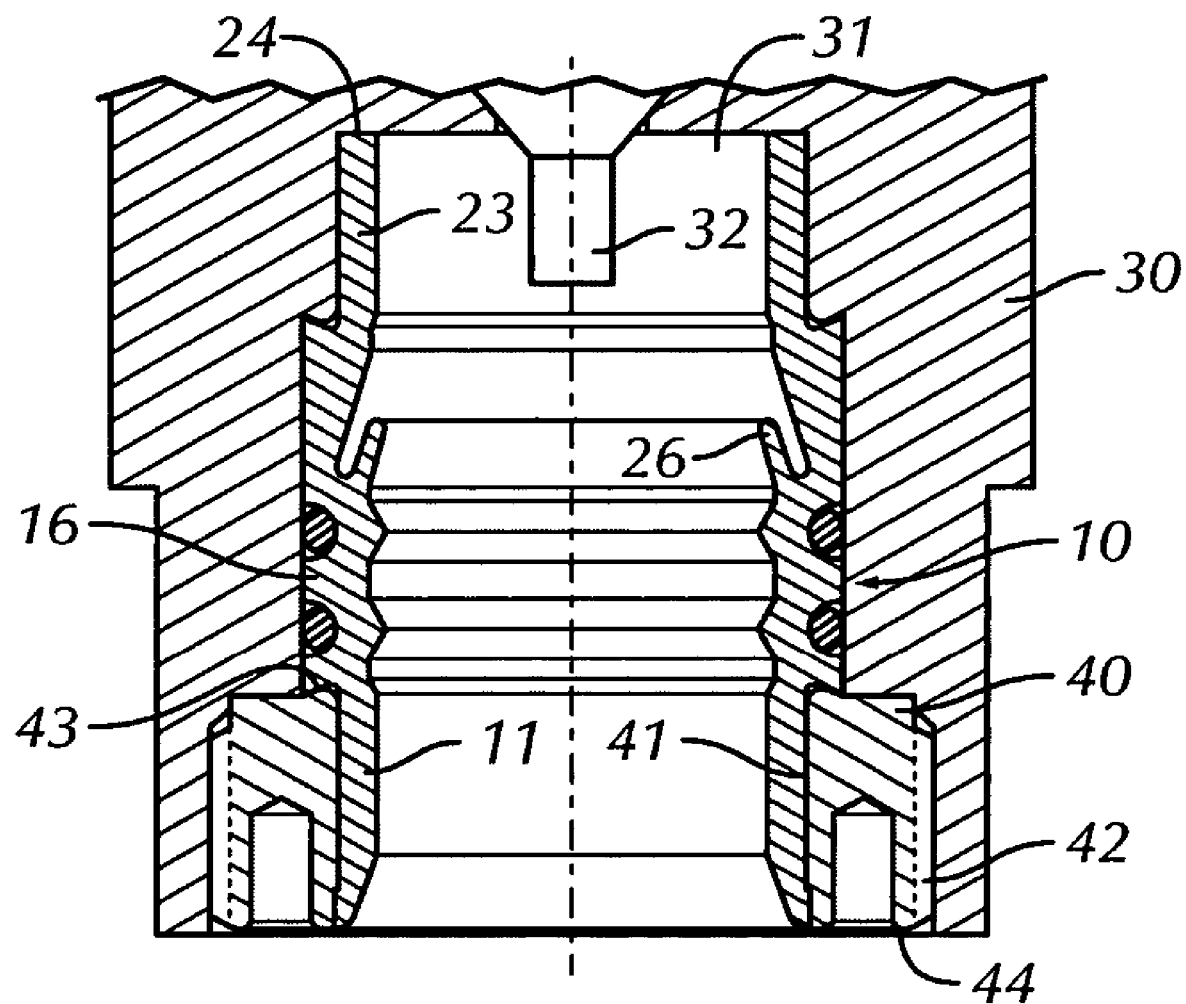
FIG. 8 is a section view of another embodiment of a bore liner of the present invention in a female undersea hydraulic coupling member.

As shown in FIG. 8, another embodiment with the same elements identified with the same reference numbers as the previous embodiments with the following differences. Sealing lip 26 may be included in seal section 16.

Figure 9:
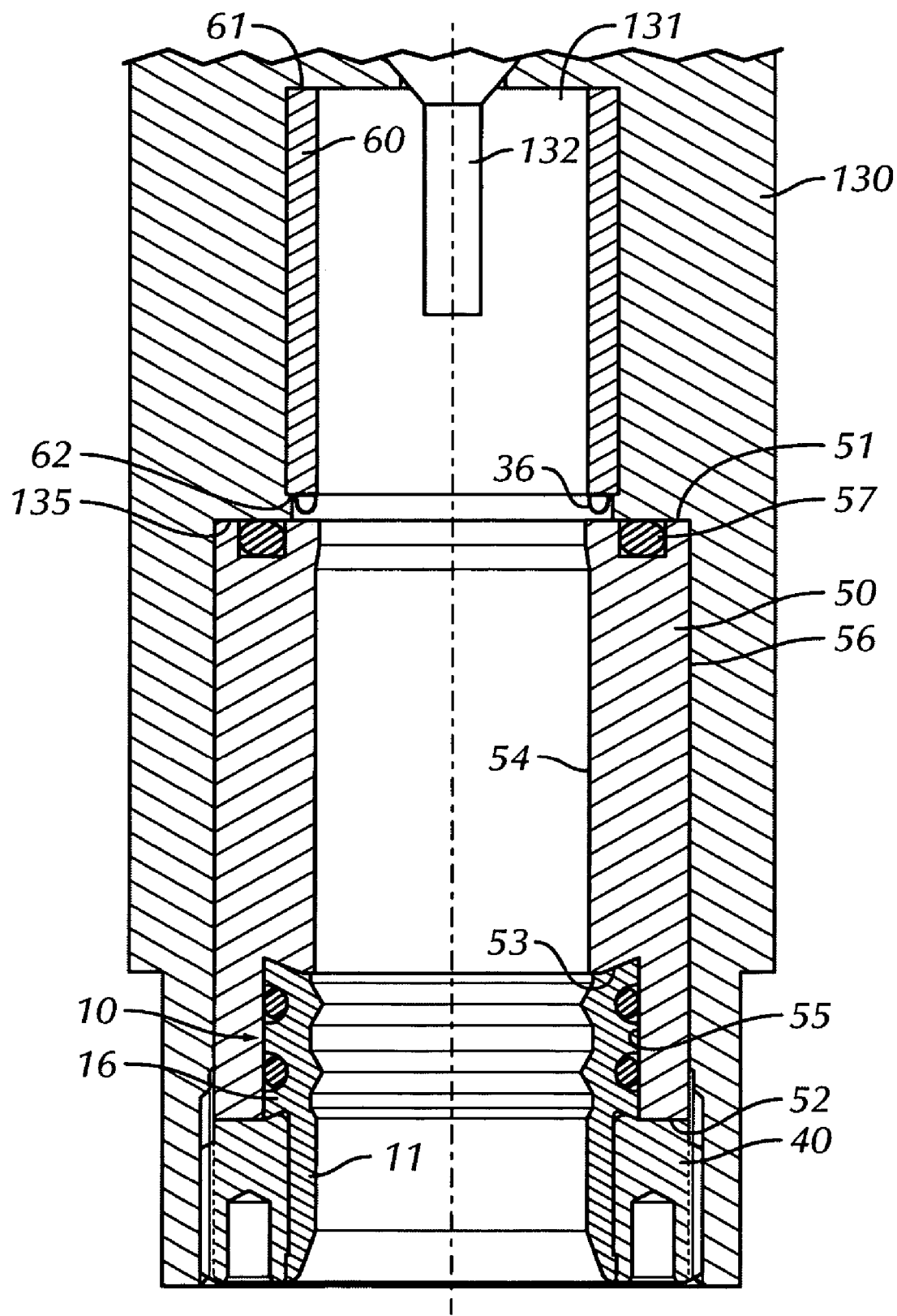
FIG. 9 is a section view of another embodiment of a bore liner of the present invention in a female undersea hydraulic coupling member with a seal retainer.

As shown in FIG. 9, the first embodiment of bore liner 10 is shown in female undersea hydraulic coupling member 130 having seal retainer 50. The female member has a bore or receiving chamber 131 and may have normally closed poppet valve 132. In this embodiment, the seal retainer may retain pressure-energized metal seal 36 in the female member of the coupling. First end 51 of the seal retainer may abut or contact internal shoulder 135 of the female coupling member. The first end of the seal retainer may include a groove in which elastomeric O-ring 57 is positioned. Retainer nut 40 may abut second end 52 of the seal retainer. The seal retainer may have an outer diameter 56, a first inner diameter 54, and a second inner diameter 55 that may be larger than the first inner diameter. The bore liner may have an interfit between inclined shoulder 53 of the seal retainer and retainer nut 40. Liner extension 60 may be a sleeve positioned in bore 31 of the female undersea hydraulic coupling member, having a first end 61 and a second end 62.

Figure 10:
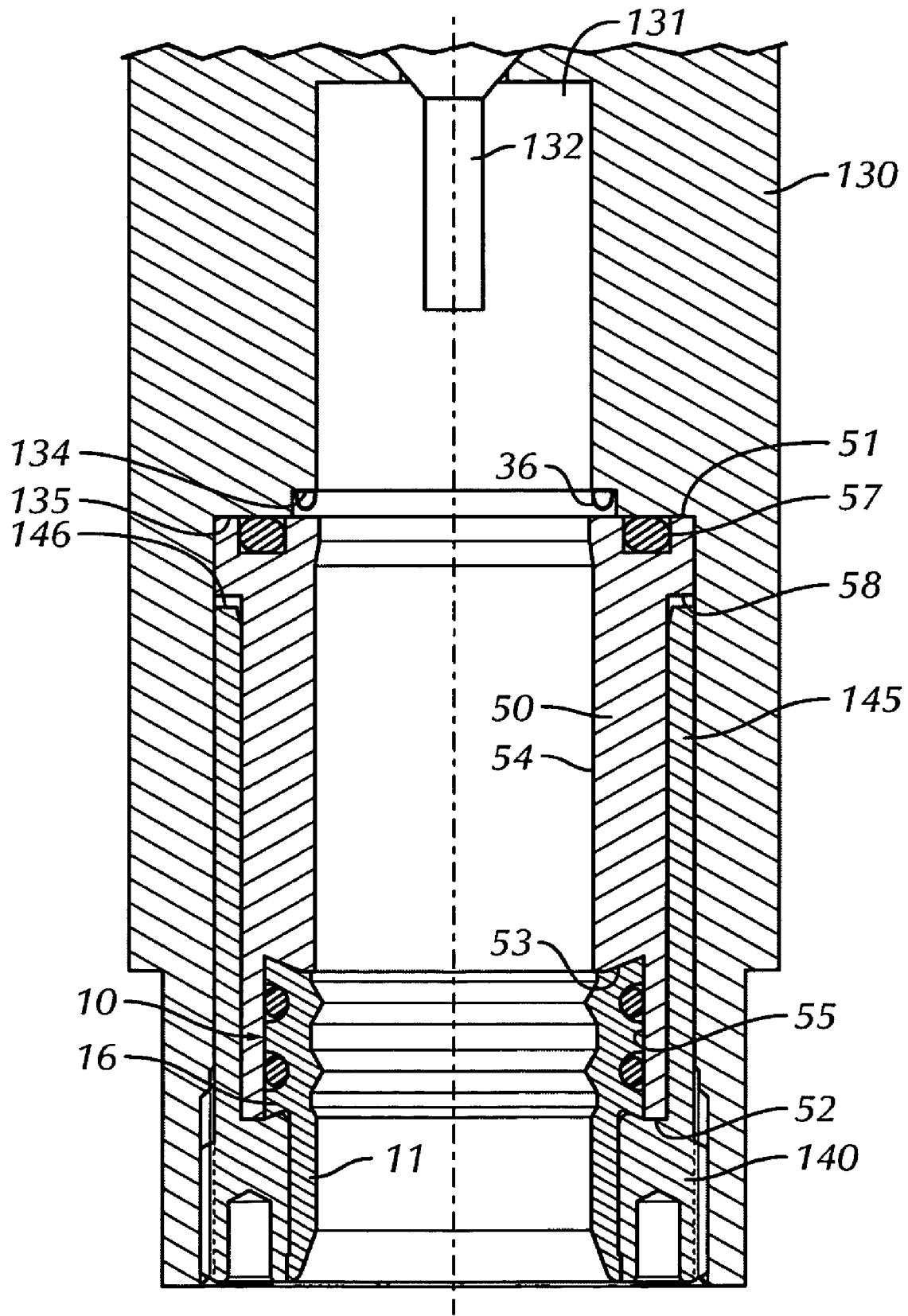
FIG. 10 is a section view of another embodiment of a bore liner of the present invention in a female undersea hydraulic coupling member with a seal retainer.

As shown in FIG. 10, the first embodiment of bore liner 10 is shown in a female undersea hydraulic coupling member having a seal retainer with the same elements identified with the same reference numbers as FIG. 9 with the following differences. The bore or receiving chamber 131 may include internal shoulder 134 on which the hollow pressure-energized metal seal 36 is positioned. Retainer nut 140 may include extension 145 terminating at end face 146. The seal retainer 50 may fit into extension 145 to provide a cartridge assembly that may be inserted and/or removed from the female coupling bore.

Figure 11:
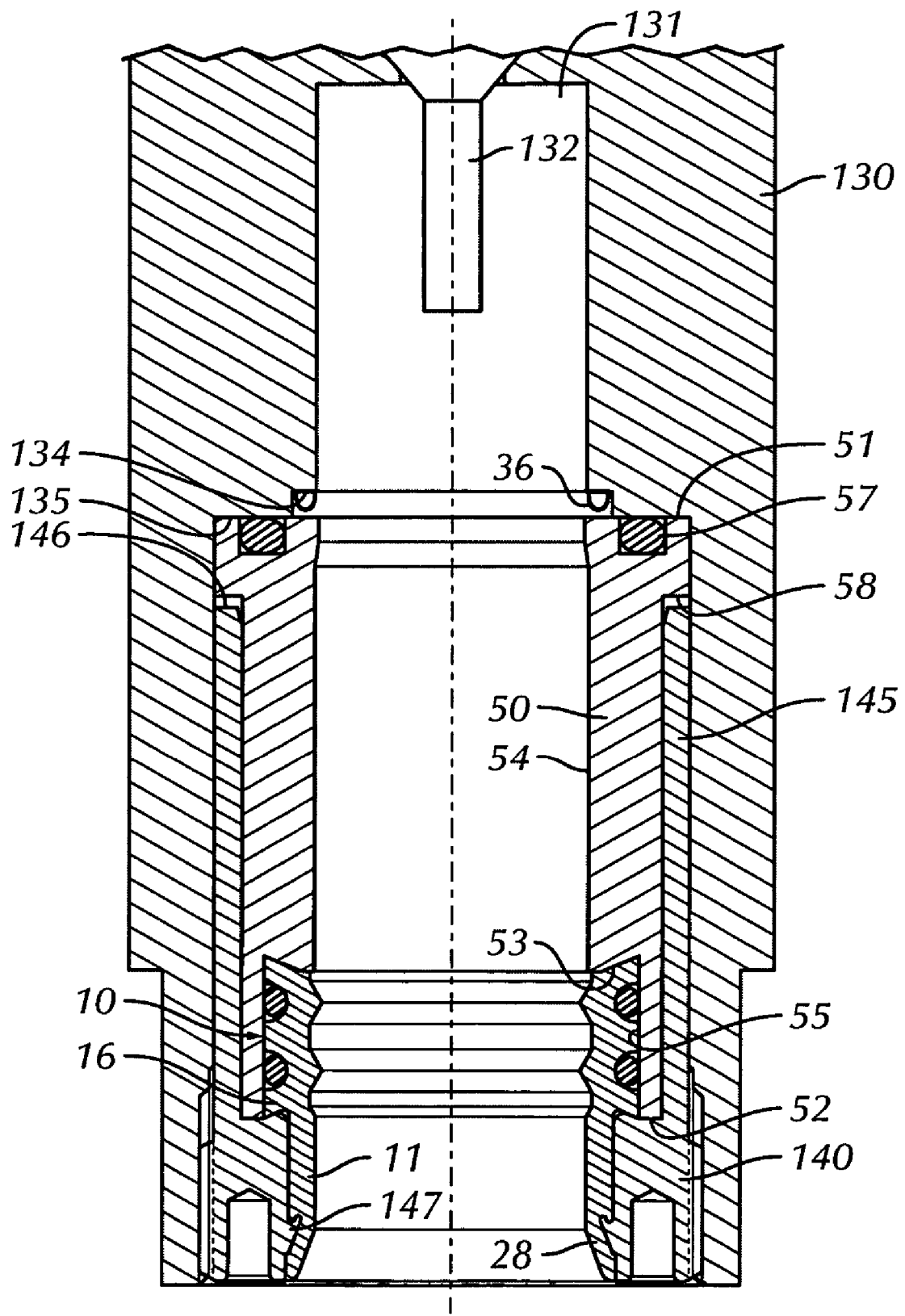
FIG. 11 is a section view of another embodiment of a bore liner of the present invention in a female undersea hydraulic coupling member with a seal retainer.

As shown in FIG. 11, another embodiment of bore liner 10 is shown in a female undersea hydraulic coupling member having a seal retainer with the same elements identified with the same reference numbers as the previous embodiments with the following differences. Retainer nut 140 may include projection 147 that interfits with interlocking cavity 28 in the liner section 11 of bore liner 10.

Figure 12:
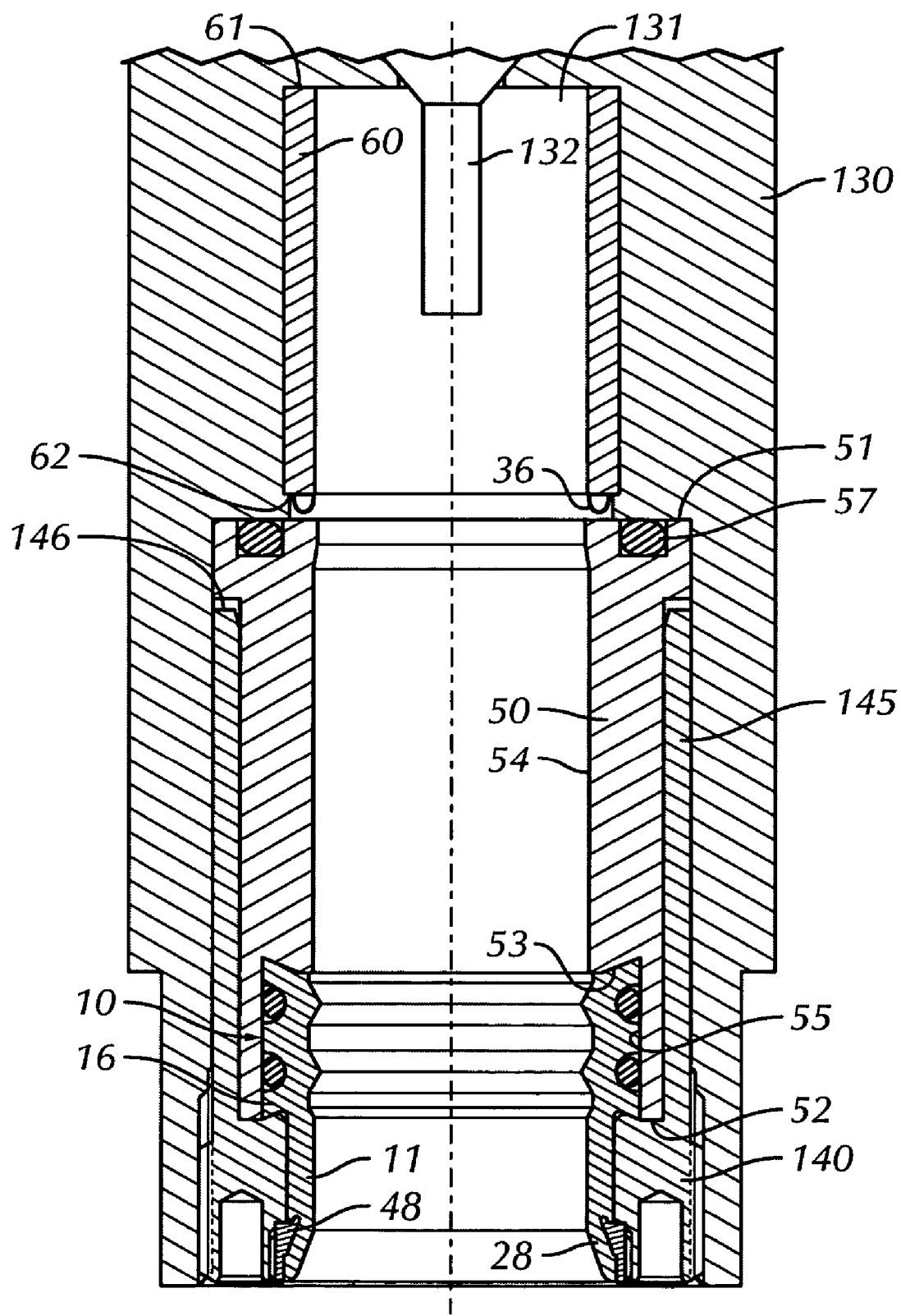
FIG. 12 is a section view of another embodiment of a bore liner of the present invention in a female undersea hydraulic coupling member with a seal retainer.

As shown in FIG. 12, another embodiment of bore liner 10 is shown in a female undersea hydraulic coupling member having a seal retainer with the same elements identified with the same reference numbers as the previous embodiments with the following differences. Interlock nut 48 may be threaded to retainer nut 140, and interfits with interlocking cavity in the liner section 11 of bore liner 10.

Figure 13:
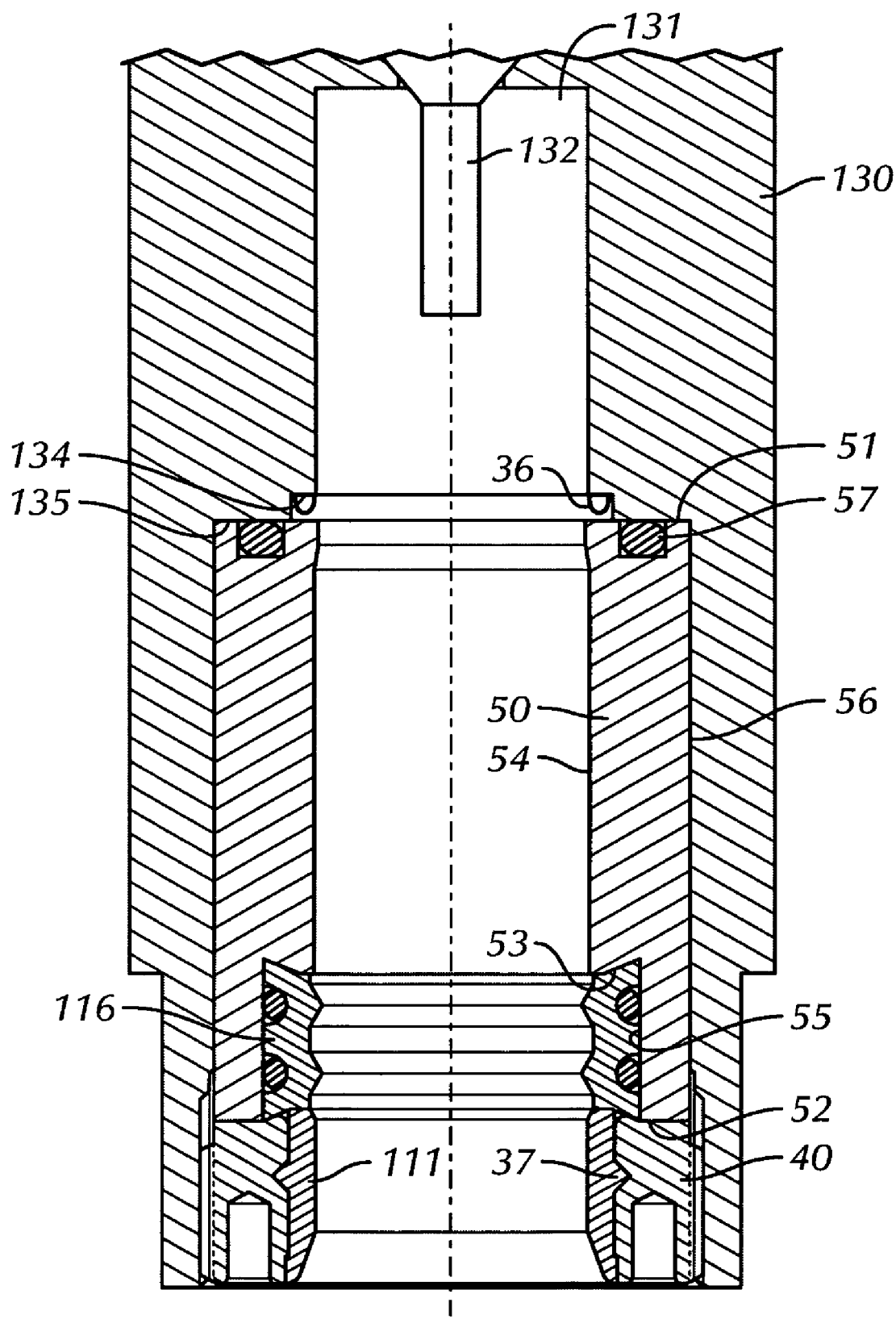
FIG. 13 is a section view of another embodiment of a bore liner of the present invention in a female undersea hydraulic coupling member with a seal retainer.

As shown in FIG. 13, another embodiment of a bore liner is shown in a female undersea hydraulic coupling member having a seal retainer with the same elements identified with the same reference numbers as the previous embodiments with the following differences. Liner section 111 and seal 116 are not integral, but are individual components. The liner section may have a circumferential projection 37 which fits into a corresponding groove in retainer nut 40.

Figure 14:
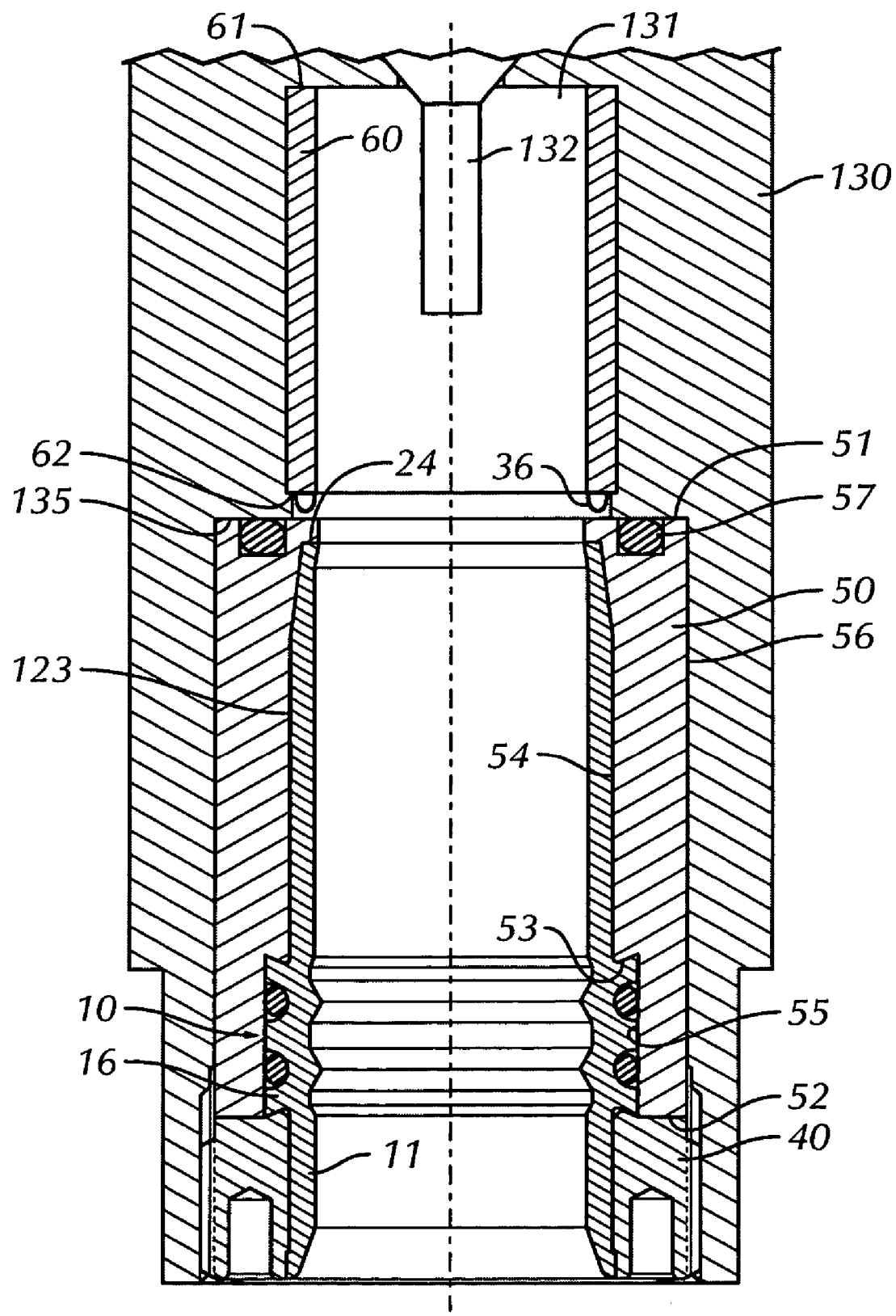
FIG. 14 is a section view of another embodiment of a bore liner of the present invention in a female undersea hydraulic coupling member with a seal retainer.

As shown in FIG. 14, another embodiment of bore liner 10 is shown in a female undersea hydraulic coupling member having a seal retainer with the same elements identified with the same reference number as the previous embodiments with the following differences. Integral liner extension 123 may extend axially from seal section 16 of the bore liner. Additionally, liner extension 60 may be positioned in the female member bore.

Although variations in the embodiment of the present invention may not each realize all the advantages of the invention, certain features may become more important than others in various applications of the device. The invention, accordingly, should be understood to be limited only by the scope of the appended claims.

What is claimed is:

1. A bore liner for preventing galling in a female undersea hydraulic coupling member bore comprising a one-piece sleeve-shaped polymer liner section with a first internal diameter, a seal section having a radial seal with a second internal diameter smaller than the first internal diameter, and an outer diameter having means for engaging the bore of a female undersea hydraulic coupling member.

2. The bore liner of claim 1 wherein the outer diameter is threaded.

3. The bore liner of claim 1 wherein the outer diameter has at least one angled outer shoulder surface.

4. The bore liner of claim 1 wherein the outer diameter has a circumferential ridge.

5. The bore liner of claim 1 wherein the liner section of the bore liner has a tapered internal diameter at a first end thereof.

6. The bore liner of claim 1 wherein the liner section of the bore liner has an internal cavity to interfit with a projection engageable to the female undersea hydraulic coupling member.

7. A female undersea hydraulic coupling member comprising a metal body, a bore in the body for receiving the probe section of a male hydraulic coupling member, the bore having a generally cylindrical internal surface, a radial seal for sealing to the probe section of a male hydraulic coupling member, the radial seal positioned in the bore and extending radially inwardly from the bore, the radial seal having an internal diameter and a sleeve-shaped polymer bore liner for preventing metal-to-metal contact between the internal surface of the bore and the probe section of a male hydraulic coupling member inserted in the bore, the bore liner being removably positioned in the bore and having an internal diameter greater than the radial seal internal diameter.

8. The female undersea hydraulic coupling member of claim 7 wherein the bore liner is integral with the radial seal.

9. The female undersea hydraulic coupling member of claim 7 wherein the bore has an angled shoulder and wherein the bore liner has an with the angled shoulder.

10. The female undersea hydraulic coupling member of claim 7 wherein the bore liner has a dovetail interfit with the bore.

11. The undersea hydraulic coupling member of claim 7 wherein the bore liner is threaded to the internal bore.

12. The female undersea hydraulic coupling member of claim 7 wherein the bore liner has a circumferential ridge and the bore has a circumferential groove into which the circumferential ridge is positionable.

13. The female undersea hydraulic coupling member of claim 7 further comprising a retainer nut engageable with the female hydraulic coupling member adjacent the bore liner.

14. The undersea hydraulic coupling member of claim 7 further comprising a second radial seal positionable in the internal bore, and a seal retainer abutting the second radial seal in the internal bore.

15. The female undersea hydraulic coupling member of claim 7 wherein the radial seal has a sealing lip extending radially inwardly from the bore liner.

16. A female undersea hydraulic coupling member comprising a metal body with an internal bore extending therethrough, at least a portion of the internal bore having a removable bore liner engaged thereto for preventing metal-to-metal contact between a surface of the internal bore and the probe section of a male hydraulic coupling member inserted into the bore, and a seal section integral with the bore liner and extending radially inwardly from the removable bore liner for sealing to the probe section of a male hydraulic coupling member inserted into the bore.

17. The female undersea hydraulic coupling member of claim 16 further comprising a retainer nut to engage the female undersea hydraulic coupling member.

18. The female undersea hydraulic coupling member of claim 17 wherein the female undersea hydraulic coupling member and retainer nut restrain axial movement of the removable bore liner.

19. the female undersea hydraulic coupling member of claim 16 wherein the seal section of the removable bore liner is pressure-energizable.

20. The female undersea hydraulic coupling member of claim 16 wherein the removable bore liner interlocks with the internal bore.

* * * * *